(12) United States Patent
Pighi et al.

(10) Patent No.: US 8,380,401 B2
(45) Date of Patent: Feb. 19, 2013

(54) AUTOMATIC GRAIN TRANSFER CONTROL SYSTEM BASED ON REAL TIME MODELING OF A FILL LEVEL PROFILE FOR REGIONS OF THE RECEIVING CONTAINER

(75) Inventors: Osman Pighi, Riva presso Chieri (IT); Bert J. F. Paquet, Bruges (BE)

(73) Assignee: CNH America LLC, New Holland, PA (US)

( * ) Notice: Subject to any disclaimer, the term of this patent is extended or adjusted under 35 U.S.C. 154(b) by 386 days.

(21) Appl. No.: 12/797,142

(22) Filed: Jun. 9, 2010

(65) Prior Publication Data

US 2011/0307149 A1 Dec. 15, 2011

(51) Int. Cl.
*G06F 19/00* (2011.01)
(52) U.S. Cl. ......................................... 701/50
(58) Field of Classification Search .................. 701/50; 56/16.6; 460/6
See application file for complete search history.

(56) References Cited

U.S. PATENT DOCUMENTS

| | | | |
|---|---|---|---|
| 3,633,158 A | 1/1972 | Heibel | |
| 5,043,735 A | 8/1991 | Mawhinney et al. | |
| 5,575,316 A | 11/1996 | Pollklas | |
| 5,749,783 A | 5/1998 | Pollklas | |
| 6,097,425 A | 8/2000 | Behnke et al. | |
| 6,587,772 B2 | 7/2003 | Behnke | |
| 6,682,416 B2 * | 1/2004 | Behnke et al. | 460/114 |
| 6,943,824 B2 | 9/2005 | Alexia et al. | |
| 7,034,741 B2 | 4/2006 | Chon et al. | |
| 7,063,614 B2 | 6/2006 | Vogelgesang et al. | |
| 7,107,836 B2 | 9/2006 | Brookner | |
| 7,113,125 B2 | 9/2006 | Le Sesne | |
| 7,142,124 B2 | 11/2006 | Chi et al. | |
| 7,408,501 B2 | 8/2008 | Rolfes et al. | |
| 8,060,283 B2 * | 11/2011 | Mott et al. | 701/50 |
| 2006/0271262 A1 | 11/2006 | McLain, III | |
| 2007/0109177 A1 | 5/2007 | Baath et al. | |
| 2007/0185672 A1 * | 8/2007 | Anderson et al. | 702/85 |
| 2007/0241904 A1 | 10/2007 | Ozaki et al. | |
| 2007/0290855 A1 | 12/2007 | Nagino et al. | |
| 2008/0143482 A1 | 6/2008 | Shoarinejad et al. | |
| 2008/0143584 A1 | 6/2008 | Shoarinejad et al. | |
| 2008/0282817 A1 | 11/2008 | Breed | |

FOREIGN PATENT DOCUMENTS

| | | |
|---|---|---|
| DE | 102007009666 | 8/2008 |
| DE | 102008002006 | 12/2009 |
| EP | 0760202 | 3/1997 |
| EP | 2044826 | 4/2009 |
| EP | 2057884 | 5/2009 |
| JP | 2008182945 | 8/2008 |

\* cited by examiner

*Primary Examiner* — James Trammell
*Assistant Examiner* — Jerrah Edwards
(74) *Attorney, Agent, or Firm* — Michael G. Harms

(57) ABSTRACT

A grain transfer control system for automatically controlling relative positions of an unloading system discharge nozzle of a work machine and a receiving container based on a real time model of a fill level profile for regions of the receiving container, the profile being modeled using known or estimated rates of flow of grain and positions of the nozzle relative to regions of the receiving container as a function of time, the system adjusting the relative positions of the nozzle and the receiving container to effect a generally even fill of the receiving container.

20 Claims, 9 Drawing Sheets

AUTOMATIC GRAIN TRANSFER CONTROL SYSTEM BASED ON REAL TIME MODELING OF A FILL LEVEL PROFILE FOR REGIONS OF THE RECEIVING CONTAINER

TECHNICAL FIELD

The present invention relates to a grain transfer control system for transferring a flow of grain from a work machine to a receiving container, and more particularly to a system including real time modeling of a fill level profile for regions of the receiving container based on known or estimated rates of the flow of grain and positions of an unloading system discharge nozzle relative to the regions of the receiving container as a function of time, the grain transfer control system automatically adjusting relative positions of the discharge nozzle and the receiving container to effect a generally even fill of the receiving container.

BACKGROUND ART

Harvesting operations in a large field typically involve unloading grain from a harvester, such as a combine, to a receiving container, such as a tractor pulled grain cart, bin, or the like. Relevant information that should be considered during the unloading process includes, but is not limited to, crop type; weather conditions; topographical conditions; relative positions of the receiving container, the combine, and the discharge nozzle of the unloading system; grain level in the container from which the grain is being transferred, e.g., the grain tank of the combine; and fill status of the grain cart/receiving container, etc. During the unloading process, the combine operator and the tractor operator work together to fill the receiving container to capacity while minimizing loss of grain. In some instances, the receiving container is stationary and the combine operator approaches the receiving container several times during harvesting of a field and positions the combine and discharge nozzle relative to the receiving container to unload the grain into the receiving container and achieve a generally even fill without spillage.

To monitor the unloading process, the combine operator and the tractor operator, if the receiving container is mobile, must observe and adjust the flow of grain by adjusting the relative position and angle of the discharge nozzle and the receiving container to achieve an even fill the receiving container and prevent grain spillage. This situation is problematic because both operators typically must look backward towards the unloading tube while driving forward when unloading on the go. The combine operator cannot continuously monitor the field and machine conditions, resulting in a risk of deviation from the desired travel path or swath, collision with unexpected obstacles in front of the combine, and/or missing alarms or warnings displayed inside the combine. The tractor operator must also take care to maintain a safe distance from the header of the combine to prevent damage to either machine. In addition, neither operator is situated to readily view the inside of the receiving container so visually monitoring the fill level of the container is typically not possible.

Achieving an even fill of a stationary receiving container is problematic because of the increasing size of the receiving containers, which can typically hold several times the capacity of the combine grain tank. As a result, the combine operator approaches a partially full receiving container without the capability to view the fill level of various regions inside the receiving container. Achieving an even fill level becomes even more difficult to accomplish if the combine and the tractor pulling the receiving container are moving, and the difficulty increases further if the terrain is uneven and/or sloped, and/or a strong, gusting, and/or direction changing wind is present. The increased operator workload presented by any of these conditions which takes attention away from the forward field of view and the displays inside the combine and/or tractor and the inability to visually monitor the fill level of the receiving container makes a capacity fill of the receiving container without spillage difficult.

Thus, what is sought is a grain transfer control system which provides one or more of the capabilities, and overcomes one or more of the shortcomings and limitations, set forth above.

SUMMARY OF THE INVENTION

What is disclosed is a grain transfer control system which provides one or more of the capabilities, and overcomes one or more of the shortcomings and limitations, set forth above.

According to a preferred embodiment of the present invention a grain transfer system for automatically controlling the transfer of grain from a grain tank of a work machine to a receiving container while the work machine and the receiving container are situated in generally side by side relative positions is provided. The work machine, such as a combine, includes an unloading system configured to direct a flow of grain from the grain tank to the receiving container through a discharge nozzle at a known flow rate in a well known manner.

The grain transfer system of the present invention provides a sensing system including a reading device mounted near or on the nozzle and a first data device disposed in or in predetermined relation to a first region of the receiving container through an nth data device disposed in or in predetermined relation to an nth region of the receiving container, respectively. The first data device includes at least information representative of a location of the first region of the receiving container, and the nth data device includes at least information representative of a location of the nth region of the receiving container, respectively. The reading device is configured to acquire information from the first data device through the nth data device, Based on that information, the sensing system is configured to determine positions of the nozzle relative to the first region through the nth region as a function of time.

The system further provides a modeling system including a processor configured to communicate with the sensing system and to model a real time fill level profile for at least one region of the receiving container. The fill level is modeled as a function of the positions of the nozzle as a function of time and the known flow rates of grain.

The modeled fill level profile may be provided to a display system configured to display information representative of the fill level profile in real time for at least an operator of the work machine. If the combine is unloading on the go, the modeled fill level profile may be provided to an operator of a vehicle transporting the receiving container.

A controller communicates with the modeling system and is configured to automatically provide a control indication for adjusting the position of the nozzle relative to the first region through the nth region for directing the flow of grain to each of the n regions, respectively, for achieving a generally even fill of the receiving container.

According to preferred aspect of the invention, the reading device comprises a radio frequency transceiver and the first through the nth data devices comprise radio frequency transponders. The transceiver is configured to interrogate the first through the nth transponders and receive the stored information from the first transponder through the nth transponder, respectively. The transponders are configured responsively output the information stored thereon when interrogated by the transceiver.

According to another aspect of the present invention, the first data device through the nth data device further includes information representative of at least one of: a total capacity of the receiving container; date and time of harvesting; field locations and conditions; and information representative of the grain.

A feature of the invention includes the capability to model a fill level profile for at least one region of the receiving container, in real time, based on the positions of the nozzle as a function of time and a known (which includes sensed, estimated, derived, etc.) flow rate of grain during the time the nozzle is delivering grain to the at least one region. During the unloading process, the modeled fill level profile is continuously updated.

In one preferred embodiment of the invention, the controller is configured to automatically control at least one of the work machine, the receiving vehicle, and/or the unloading tube/discharge nozzle for adjusting the relative position of the work machine and the receiving vehicle and/or the position of the nozzle relative to the first region through the nth region of the receiving container.

In another preferred embodiment, the controller is configured to automatically provide the control indication to the operator of the work machine and/or the operator of the receiving vehicle to enable adjusting the relative position of the work machine and the receiving container, and/or the position of the nozzle relative to the n regions of the receiving container.

According to another aspect of the invention, the controller is configured to automatically provide a control indication to the work machine operator, and the work machine operator provides control inputs to the work machine, the receiving vehicle, and the unloading tube/discharge nozzle.

Another feature of the invention is the capability to automatically stop the flow of grain when the nozzle position would cause the flow of grain to be delivered outside the receiving container or to a region having a modeled fill level profile indicating that the region is full.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
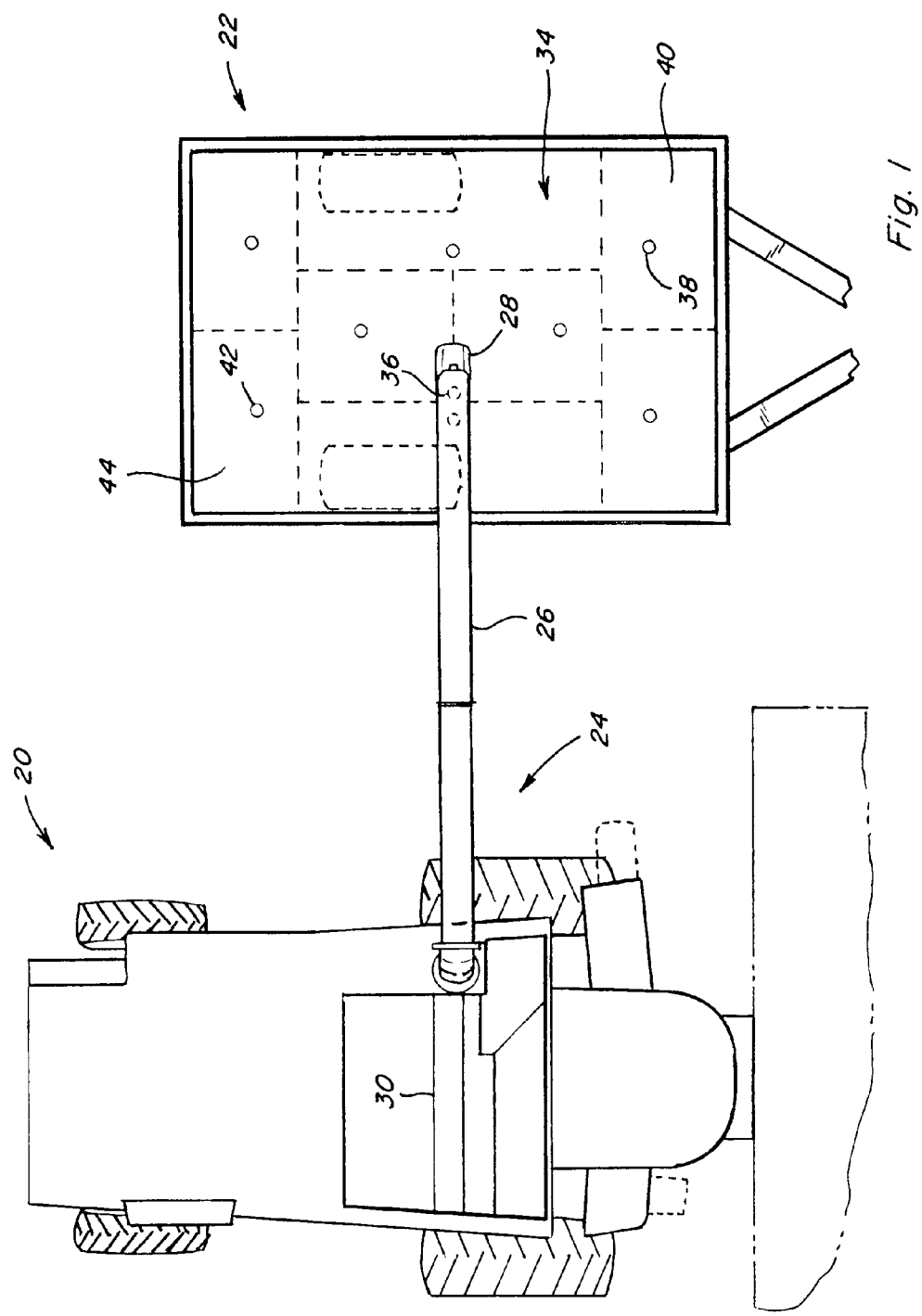
FIG. 1 is a top view of a representative work machine, such as a combine, having an unloading tube nozzle positioned over one of a plurality of regions of a receiving container for an unloading operation according to the grain transfer control system of the present invention.

Referring now to the drawings, wherein like numbers refer to like items, FIG. 1 depicts a representative agricultural harvesting work machine, which is shown here as a combine 20, including an unloading system 24 of well-known construction and operation. A cylindrical shaped unloading tube 26 including a discharge nozzle 28 is shown in a deployed or unloading position for unloading crop material into an accompanying container, which here is illustrated by a conventional grain receiving container 22, situated in a generally side by side relationship with combine 20, in the well-known manner. This is intended to be representative of a wide variety of unloading operations, wherein a known rate of flow of grain from combine 20 is to be directed into a receiving container, such as receiving container 22, periodically during operation of combine 20. When not in use, unloading tube 26 is stored in a position extending rearwardly (not shown) from combine 20, also in the well known manner.

Figure 2:
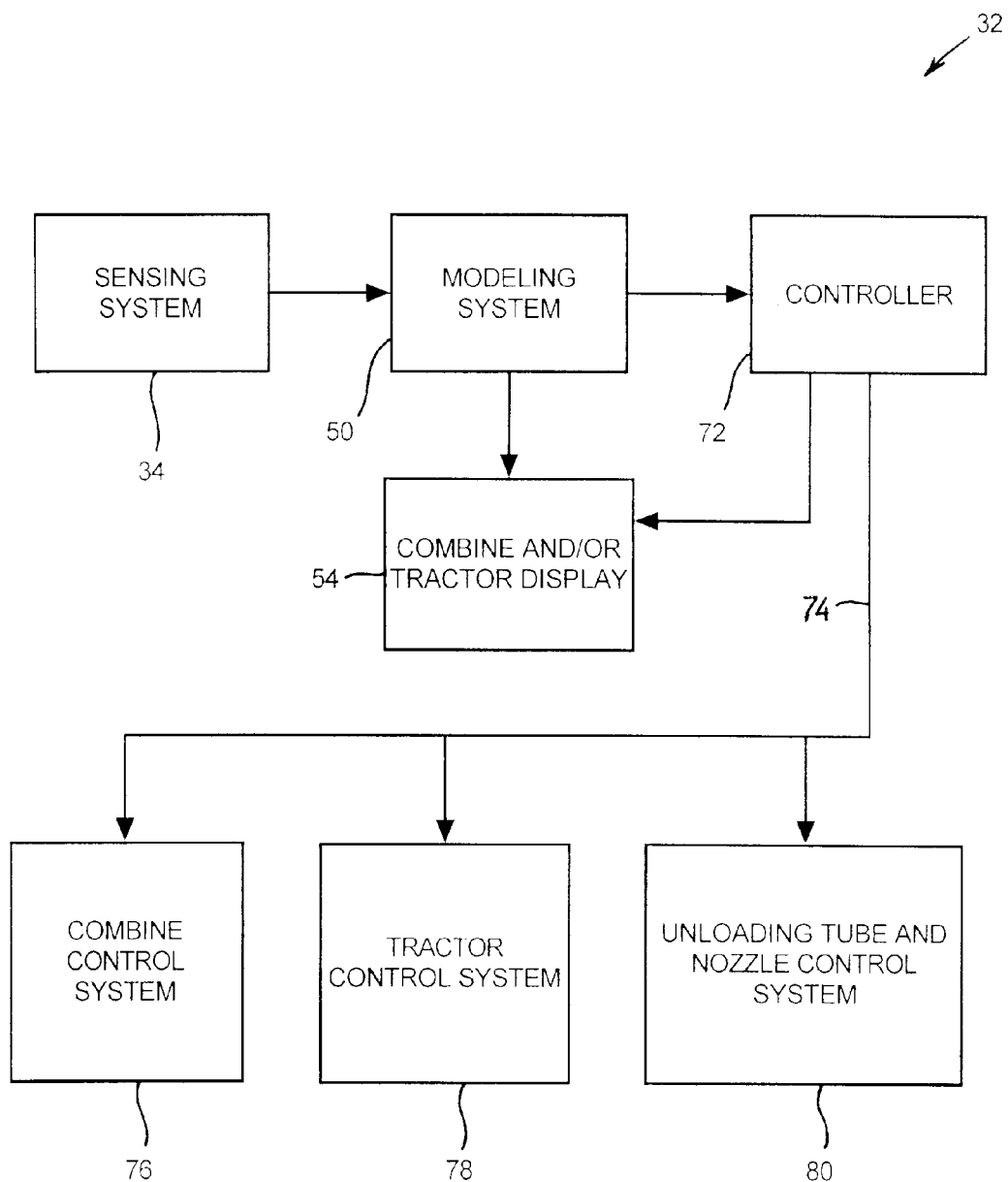
FIG. 2 is a top level block diagram of various components of the grain transfer control system of the present invention.

As shown in FIGS. 1 and 2, a grain transfer control system 32 according to the present invention includes a sensing system 34 including a reading device 36 and a first data device 38 disposed in or in a predetermined relation to a first region 40 of receiving container 22 through an nth data device 42 disposed in or in a predetermined relation to an nth region 44 of receiving container 22, respectively. First data device 38 includes at least information representative of a location of first region 40 of receiving container 22, and nth data device 42 includes at least information representative of a location of nth region 44 of receiving container 22, respectively. Reading device 36 is mounted on or near nozzle 28 and configured to for acquire information from first data device 38 through nth data device 42. Based on this information, sensing system 34 is configured to determine the positions of nozzle 28 relative to first region 40 through nth region 44 as a function of time.

According to a preferred embodiment of the invention, sensing system 34 utilizes radio frequency identification technology, and preferred apparatus for reading device 36 includes a radio frequency transceiver, and preferred apparatus for first through nth data devices 38, 42 include radio frequency transponders, respectively. In operation, the transceiver is configured to automatically interrogate the first through the nth transponders, and receive the stored information from the first through nth transponders, respectively. The first through nth transponders are configured to automatically responsively output the information representative of the location of first through nth regions 38, 42, respectively, when interrogated.

According to an aspect of the invention at least one of first data device 38 through nth data device 42 further includes information representative of at least one of: a total capacity of receiving container 22; date and time of harvesting; field locations and conditions; information representative of the grain, which may include seed type, chemicals applied, growing conditions, and moisture content, and the like.

Figure 3:
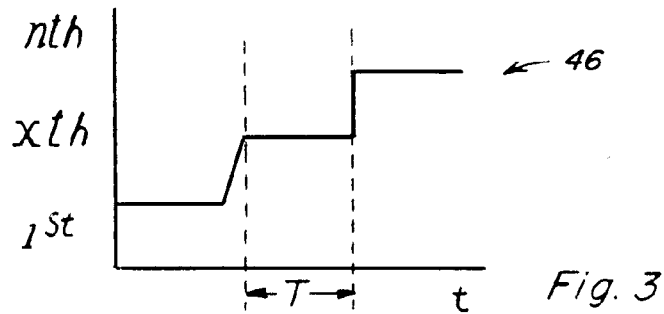
FIG. 3 is a representative plot of the unloading tube nozzle position as a function of time.

A representative example of nozzle position versus time is shown graphically as a plot 46 of FIG. 3. In addition to the nozzle positions as a function of time, the known flow rates of grain from the nozzle at each nozzle position are utilized by grain transfer system 32. As used in this description, the known flow rate of grain comprises sensed, estimated, derived, or otherwise determined flow rates of grain. A representative example of flow rates at various times during the unloading operation is shown graphically as a plot 48 of FIG. 4.

Figure 4:
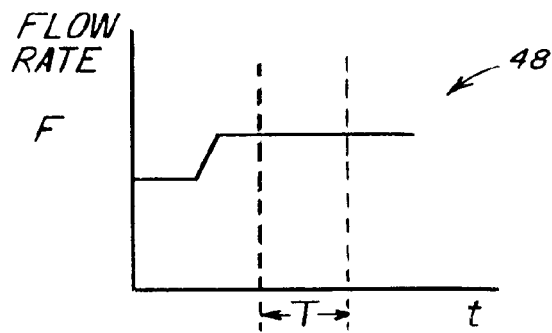
FIG. 4 is a representative plot known or estimated flow rates of grain from the unloading tube nozzle.
Figure 5:
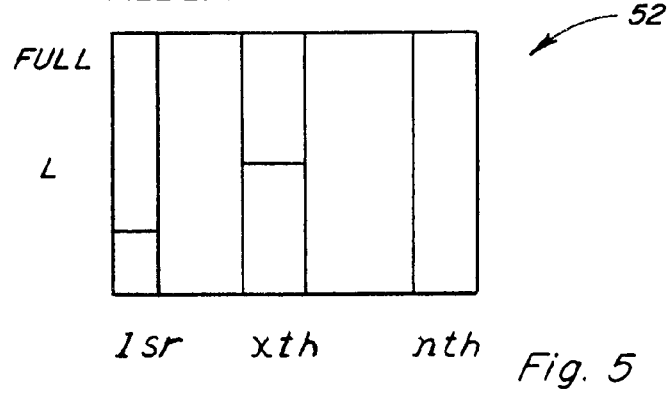
FIG. 5 is a representative real time fill level profile for at least one of the regions of a receiving container as modeled by the invention.

Turning also to FIGS. 3-5, a modeling system 50 including a processor is configured to communicate with sensing system 34 and model a real time fill level profile for at least one region of receiving container 22. A representative example of such modeled fill level profile is shown as profile 52 of FIG. 5. With reference to FIGS. 3-5, during example time period T, nozzle 28 is directing a flow of grain into the xth region of receiving container 22 at a flow rate F. At the end of time T, modeling system 50 displays a modeled fill level L in the xth region which corresponds to the sum of the grain in the xth region prior to time T and the grain deposited in the xth region during time T.

Figure 6:
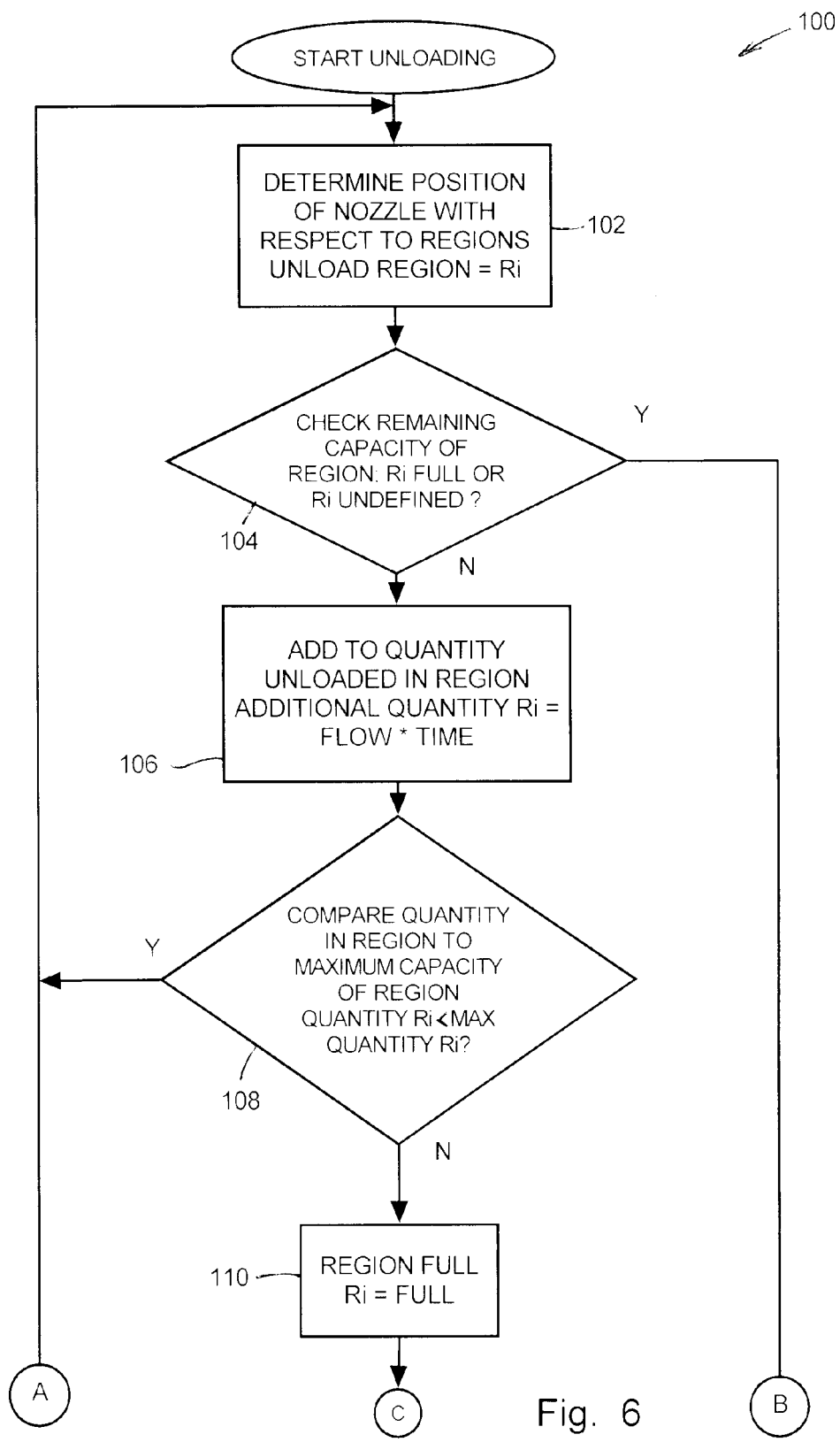
FIG. 6 is a high level flow diagram depicting an embodiment of steps for creating the real time fill level profile of at least one the regions of the receiving container.
Figure 6:
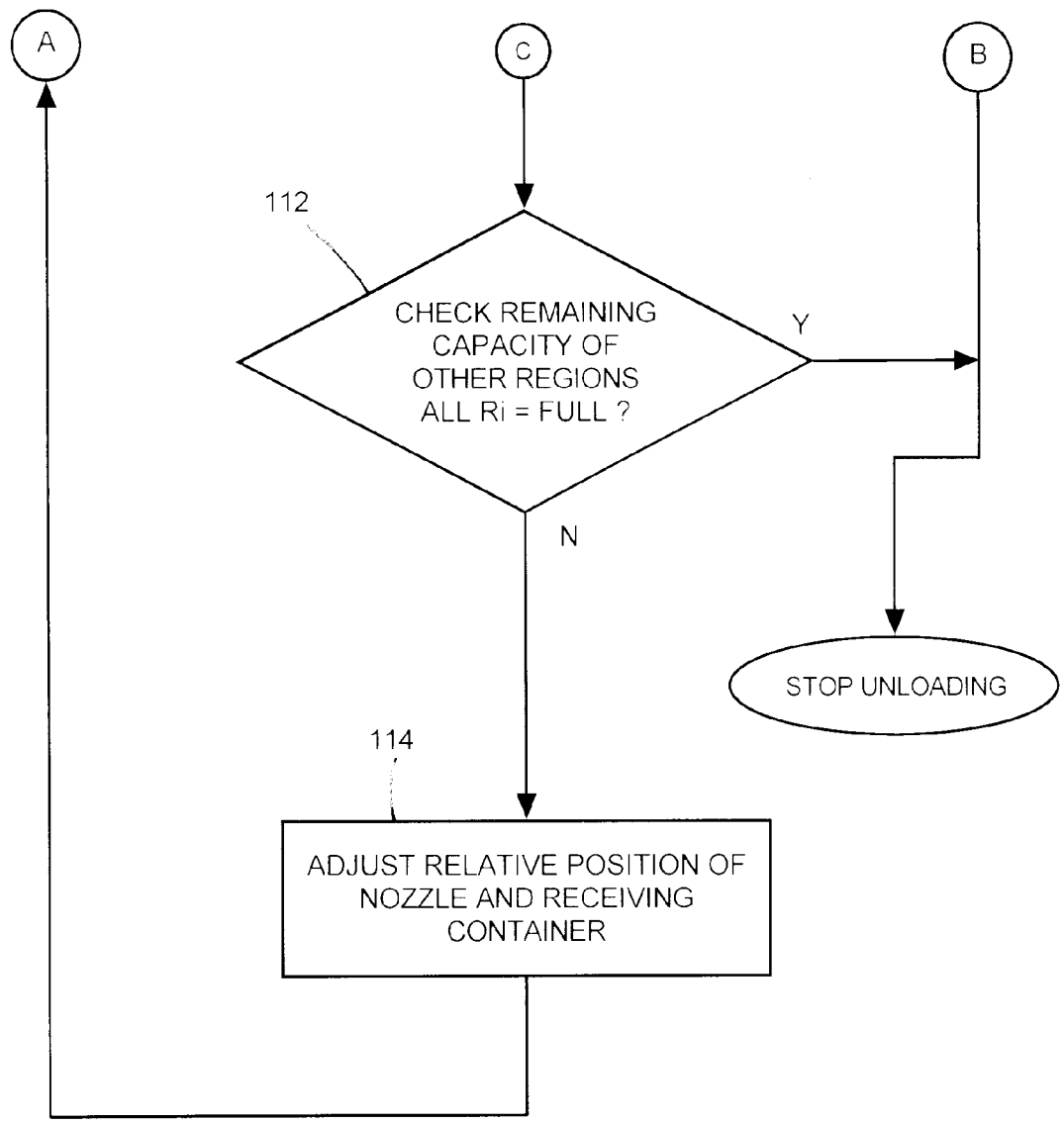

A flow diagram shown in FIG. 6 includes a portion of a representative routine 100 that may be implemented by modeling system 50. When the unloading process begins, the position of nozzle 28 relative to first region 40 through nth region 44 is determined, and the region into which nozzle 28 is unloading is referenced as Ri at block 102. Nozzle 28 positions may, for example, be determined by communication with sensing system 34. If nozzle 28 is positioned over a region that modeling system 50 has determined is full or if nozzle 28 is not positioned over any region, the unloading process is stopped to prevent spillage as seen at decision block 104. Otherwise modeling system 50 updates the model of the fill level profile (e.g. profile 52) by increasing the fill level for region Ri as seen at block 106. The increased fill level of region Ri is compared to the known maximum capacity of region Ri at block 108. If the modeled fill level profile indicates region Ri is not full, the unloading process continues. However, if the modeled profile indicates region Ri is full, modeling system 50 looks to the modeled fill level profile for the other regions at block 112. If at least one region is not full, modeling system 50 provides an indication to adjust the relative positions of nozzle 28 and receiving container 22 at block 114. If the modeled fill level profile indicates all regions of receiving container 22 are full, the unloading process is stopped to prevent spillage due to overfilling.

Figure 7:
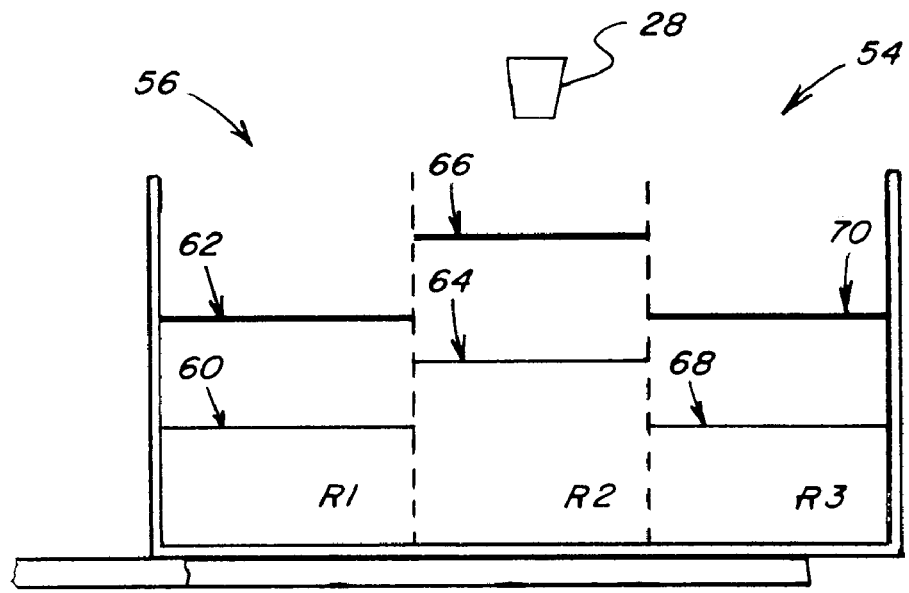
FIG. 7 is a representative display for use by an operator of the combine or a receiving vehicle depicting a real time model of a lateral fill level profile for the receiving container.
Figure 8:
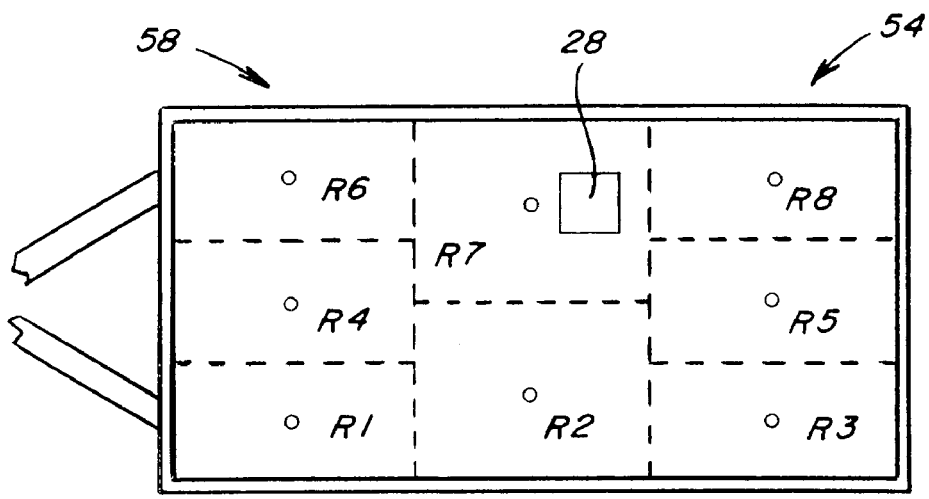
FIG. 8 is a representative display for use by the operator of the combine or the receiving vehicle depicting a real time model of an aerial fill level profile for the receiving container.

According to an aspect of the invention, a display system 54 is configured to display information representative of the modeled fill level profile in real time for an operator of combine 20 and/or an operator of a receiving vehicle, such as a tractor, (not shown) controlling movement of receiving container 22. FIGS. 7-8 represent modeled fill level profiles and the current position of nozzle 28 for receiving container 22 divided into 8 regions denoted R1-R8. FIG. 7 depicts a modeled lateral fill level profile 56 of regions R1-R3 of receiving container 22. Region R3 has a maximum fill level denoted 62 and is presently filled to a fill level denoted 60. Similarly, region R3 has a maximum fill level denoted 70 and is presently filled at a fill level denoted 68. Finally, region R2 has a maximum fill level denoted 66 and is presently filled at a fill level denoted 64. It is important to note that maximum fill level 66 of region R2 is larger than that of regions R1 and R3 because region R2 is a larger region of receiving container 22. Modeled lateral fill level profiles of regions R4-R8 can also be displayed as requested by the operator(s). An aerial fill level profile 58 for receiving container 22 shown in FIG. 8 presents a top view of the modeled fill level profile of regions R1-R8. Fill level of the regions may be indicated by color on the display of profile 58. For example, as a region fills, the color may change from green when empty, to blue to yellow, and to red, when full.

A controller 72 is configured to communicate with modeling system 50 and automatically provide a control indication 74 for adjusting the position of nozzle 28 relative to first region 40 through nth region 44 for directing the flow of grain to each of the n regions, respectively, for achieving a generally even fill of receiving container 22. Control indication 74 may adjust the position of nozzle 28 over the regions of receiving container 22 by providing an indication for adjusting one or more of the relative position of combine 20 and receiving container 22; the position of unloading tube 26 over receiving container 22; and the orientation of nozzle 28 over receiving container 22.

Figure 9:
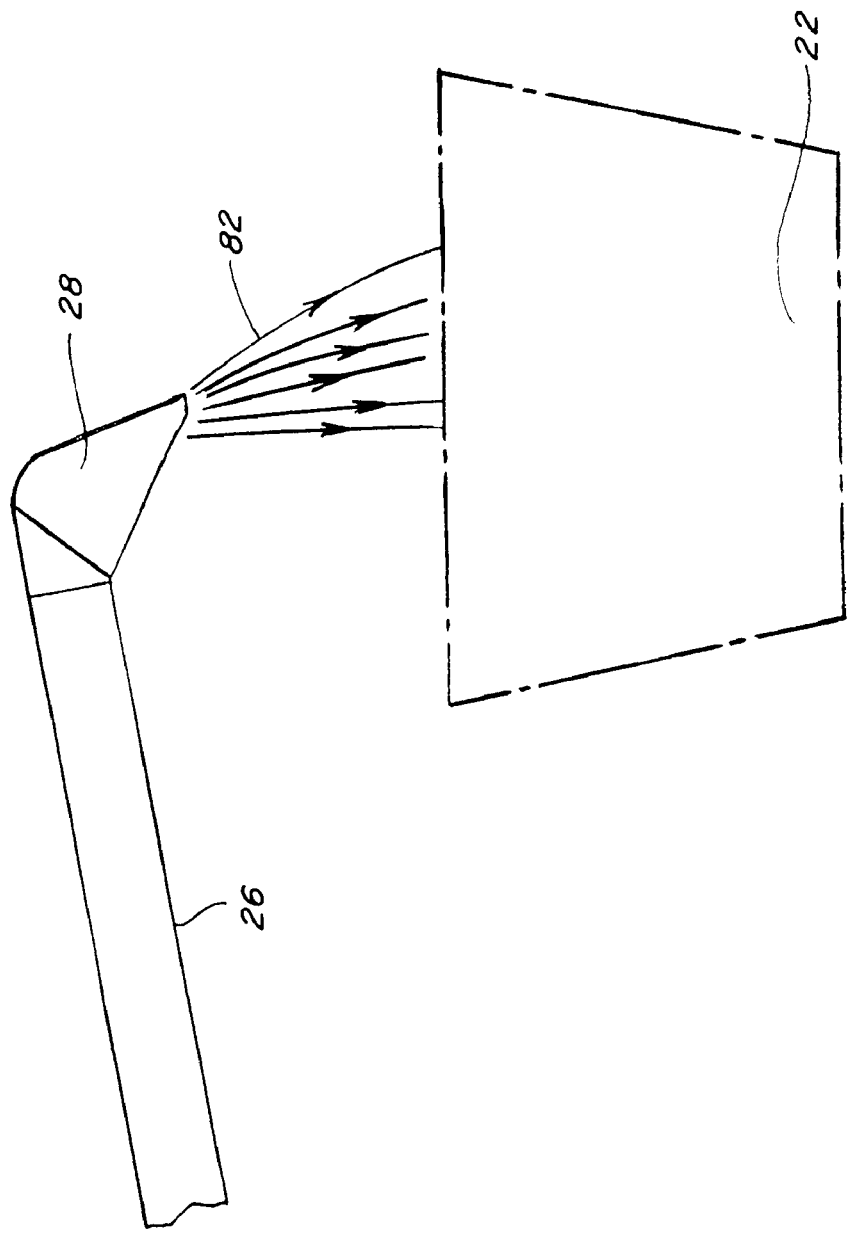
FIG. 9 is a partial side view of the unloading tube nozzle positioned over the receiving container depicting a variation in grain flow trajectories based on various orientations of the nozzle.
Figure 10:
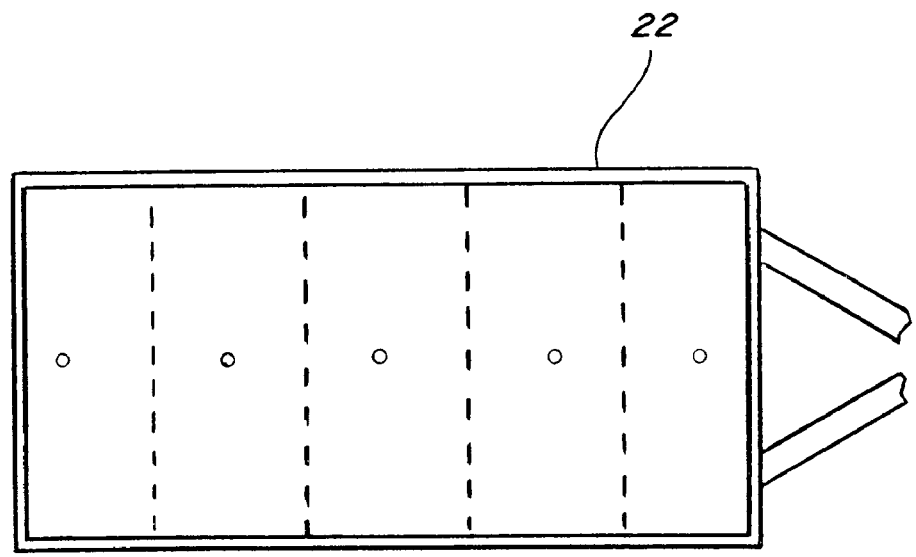
FIG. 10 is representative arrangement of data devices and definition of regions according to the present invention.
Figure 11:
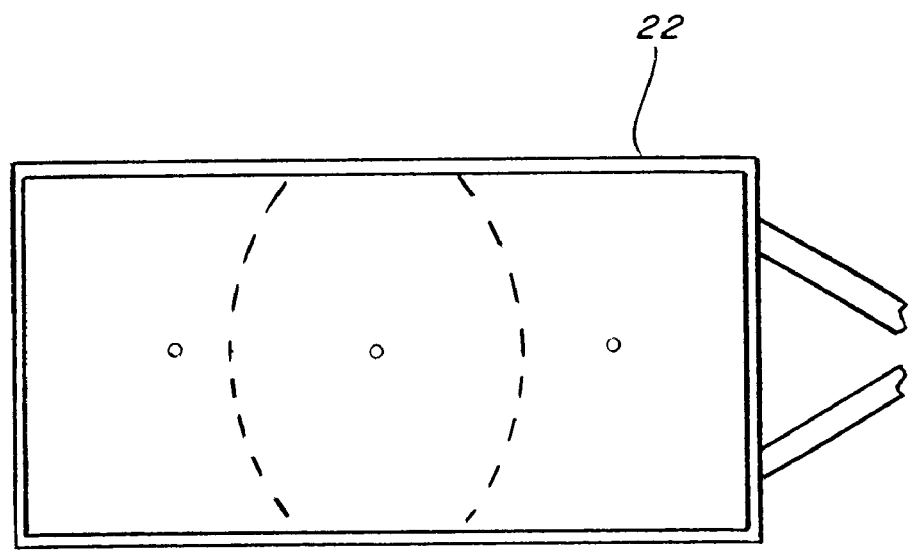
FIG. 11 is another representative arrangement of data devices and definition of regions according to the present invention.
Figure 12:
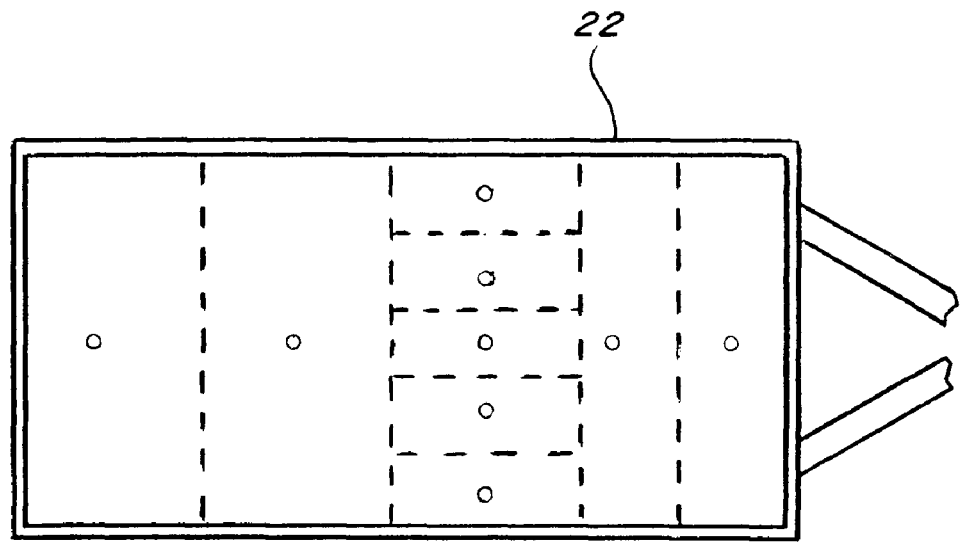
FIG. 12 is yet another representative arrangement of data devices and definition of regions according to the present invention.
Figure 13:
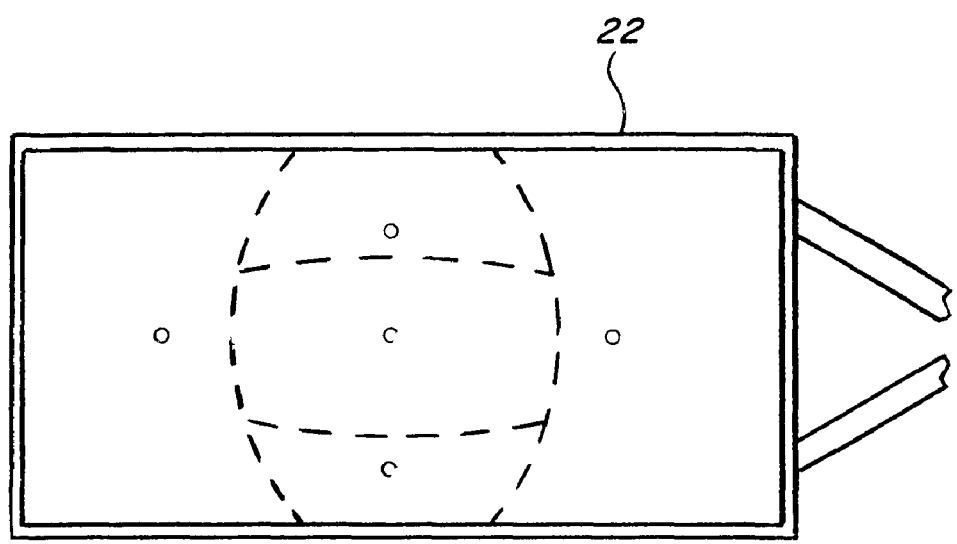
FIG. 13 is yet another representative arrangement of data devices and definition of regions according to the present invention.

With regard to FIG. 2, control indication 74 may direct a combine control system 76 to adjust position or speed of combine 22. If combine 22 is unloading on the go, control indication 74 may direct a receiving vehicle or tractor control system 78 to adjust position or speed to adjust the position of receiving container 22 relative to combine 22. If unloading system 24 allows independent adjustment of unloading tube 26 and/or nozzle 28, control indication 74 may direct an unloading tube/nozzle control system 80 to adjust the position of unloading tube 26 and/or orientation of nozzle 28. FIG. 9 depicts a representative variation in grain flow trajectories 82 based on adjustments in orientation of nozzle 28 in one direction. Control indication 74 may include indications to one or more combinations of control systems 76, 78, 80 for maximum flexibility. For example, control indication 74 may provide indications to combine control system 76 and tractor control system 78 to close the lateral distance between combine 22 and receiving container 22. Alternately, or in addition, control indication 74 may provide an indication to unloading tube/nozzle control system 80 to orient nozzle 28 to effectively close the lateral distance between combine 20 and receiving container 22. Control indication 74 can develop or learn rules for governing selection of appropriate indications or the rules or indications can be predetermined or inputted, for example, based on a particular machine configuration and/or other conditions or parameters for a particular application.

According to another aspect of the invention, control indication 74 may be provided to the operator of combine 22 and/or the operator of the receiving vehicle for operator controlled inputs. According to yet another aspect of the invention, the operator of combine 20 may receive control indication 74 and provide operator input to combine 20, tractor control system 78, and unloading tube/nozzle control system 80.

FIGS. 1 and 8 depict representative sensing system 34 arrangements of data devices and associated regions. FIGS. 10-13 depict possible alternate arrangements of data devices, denoted by open dots, and definitions of associated regions, delineated by dotted lines. These examples are not exhaustive, and configurations may be customized for a particular unloading situation.

While the foregoing discussion has most specifically addressed the unloading of grain from a combine to a receiving container, it should also be understood and appreciated that the present invention is not limited to such types of vehicles and to grain unloading, but may be advantageously employed with various work machines for coordinating the transfer therebetween of various, generally crop, materials.

In light of all the foregoing, it should thus be apparent to those skilled in the art that there has been shown and described a grain transfer control system based on real time modeling of a fill level profile of the receiving container for providing a more even fill level during a grain transfer operation. However, it should also be apparent that, within the principles and scope of the invention, many changes are possible and contemplated, including in the details, materials, and arrangements of parts and the sequences of operation which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A grain transfer system for automatically controlling the transfer of grain from a grain tank of a work machine to a receiving container while the work machine and the receiving container are situated in generally side by side relative positions, the work machine including an unloading system including an unloading tube having a discharge nozzle, the unloading system configured and operable for directing a flow of grain from the grain tank to the receiving container through the discharge nozzle at a known flow rate, comprising:

a sensing system including a reading device mounted near or on the nozzle and a first data device disposed in or in predetermined relation to a first region of the receiving container through an nth data device disposed in or in predetermined relation to an nth region of the receiving container, respectively, the first data device including at least information representative of a location of the first region of the receiving container and the nth data device including at least information representative of a location of the nth region of the receiving container, respectively, the reading device configured to electrically communicate with the first data device through the nth data device in order to at least acquire location information for the first through nth data devices, wherein based on the acquired location information from the first through nth data devices, the sensing system configured to determine positions of the nozzle relative to the first region through the nth region as a function of time;

a modeling system including a processor configured to communicate with sensing system and to model a real time fill level profile for at least one region of the receiving container as a function of the positions of the nozzle as a function of time and the known flow rates of grain;

a display system configured to display information representative of the fill level profile in real time for at least an operator of the work machine; and a controller in communication with the modeling system and configured to automatically provide a control indication for adjusting the position of the nozzle based on at least one of the location information and the real time fill level profiles of the first region through the nth region for directing the flow of grain to each of the n regions, respectively, for achieving a generally even fill of the receiving container.

2. The grain transfer system of claim 1 wherein at least one of the first data device through the nth data device further includes information representative of at least one of: a total capacity of the receiving container; date and time of harvesting; field locations and conditions; and information representative of the grain.

3. The grain transfer system of claim 1 wherein the reading device comprises a radio frequency transceiver and the first through the nth data devices comprise radio frequency transponders, the transceiver configured to operate for interrogating the first through the nth transponders and receiving the stored information from the first transponder through the nth transponder, respectively, the transponders configured to responsively output the information stored thereon when interrogated by the transceiver.

4. The grain transfer system of claim 1 wherein the modeling system is configured to automatically receive the known flow rates and the positions of the nozzle as a function of time and to model the fill level profile for at least one of the first region through the nth region based on the known flow rates during time intervals when the nozzle is directing the flow of grain to the first region through the nth region, respectively, and to update the fill level profile as the flow of grain is delivered to the receiving container.

5. The grain transfer system of claim 1 wherein the controller is further configured to provide the control indication to the operator of the work machine to enable adjusting the relative position of the work machine and the receiving container.

6. The grain transfer system of claim 1 wherein the controller is further configured to automatically adjust the relative position of the work machine and the receiving container.

7. The grain transfer system of claim 1 wherein a receiving vehicle controls movement of the receiving container and the controller is further configured to automatically provide a control indication to at least one of an operator of the work machine and an operator of the receiving vehicle to enable adjusting the relative position of the work machine and the receiving container.

8. The grain transfer system of claim 7 wherein the controller is further configured to automatically control at least one of the work machine and the receiving vehicle to adjust the relative position of the work machine and the receiving vehicle.

9. The grain transfer system of claim 7 wherein the controller is further configured to automatically control the receiving vehicle to adjust the position thereof relative to the work machine.

10. The grain transfer system of claim 1 wherein the controller is further configured to automatically adjust the position of the nozzle relative to the first region through the nth region, respectively, to adjust the relative position of the work machine and the receiving vehicle, and to stop the flow of grain when the nozzle position would cause the flow of grain to be delivered outside the receiving container or to a region having a modeled fill level profile indicating that the region is full.

11. A grain transfer system for automatically controlling the transfer of grain from a grain tank of a mobile work machine to a receiving container of a mobile receiving vehicle while the work machine and the receiving vehicle are driven in a generally side by side relation, comprising:

an unloading system configured to direct a flow of grain from the grain tank along an unloading tube through a discharge nozzle, the unloading tube being extendible from the work machine to position the nozzle for delivering the flow of grain at a known rate to a first region of the receiving container when the work machine and the receiving vehicle are positioned at a first relative position through an nth region of the receiving container when the work machine and the receiving vehicle are positioned at an nth relative position, respectively;

a sensing system including a reading device mounted near or on the discharge nozzle in operative communication with a first data device configured to store and transmit information representative of a location of the first region and disposed in or in predetermined relation to the first region through an nth data device configured to operate for storing information representative of a location of the nth region and disposed in or in predetermined relation to the nth region, respectively, the reading device configured to automatically acquire data from the first data device through the nth data device, respectively, the sensing system configured to automatically determine location positions of the nozzle relative to the location of the first region through the location of the nth region, respectively, as a function of time;

a modeling system including a processor configured to communicate with the sensing system and to automatically model a real time fill level profile for at least one region of the receiving container as a function of the positions of the nozzle relative to the first region through the nth region, respectively, as a function of time and the known rate or rates of flow of grain;

a display system configured and operable to display the fill level profile for at least one of an operator of the work machine and an operator of the receiving vehicle; and a controller configured and operable to automatically provide a control indication to at least one of the operator of the work machine and the operator of the receiving vehicle to enable adjusting the position of the nozzle based on at least one of the location position of the nozzle and the real time fill level profiles of the first region through the nth region, respectively, for directing the flow of grain to each of the n regions for a generally even fill of the receiving container.

12. The grain transfer system of claim 11 wherein at least one of the first data device through the nth data device further includes information representative of at least one of: a total capacity of the receiving container; date and time of harvesting; field locations and conditions; and information related to the grain.

13. The grain transfer system of claim 11 wherein the reading device comprises a radio frequency transceiver and the first through the nth data devices comprise radio frequency transponders, respectively, the transceiver being configured to automatically interrogate the first through the nth transponders and to receive the stored information from the first transponder through the nth transponder, respectively, the transponders being configured to automatically responsively output the information stored thereon when interrogated by the transceiver.

14. The grain transfer system of claim 11 wherein the modeling system is configured to automatically receive the known rate or rates of flow of grain and the positions of the nozzle as a function of time and to model the fill level profile for at least one of the first region through the nth region based on the rates of flow of grain during time intervals when the nozzle is directing the flow of grain to the first region through the nth regions, respectively, and to update the fill level profile during the unloading process.

15. The grain transfer system of claim 11 wherein the controller is further configured to automatically control at least one of the work machine and the receiving vehicle for adjusting the relative position thereof.

16. The grain transfer system of claim 11 wherein at least one of the operator of the work machine and the operator of the receiving vehicle controls the position of the unloading tube for adjusting the position of the nozzle relative to the first region through the nth region, respectively.

17. The grain transfer system of claim 11 wherein the controller is further configured to automatically adjust the position of the nozzle relative to the first region through the nth region, respectively.

18. The grain transfer system of claim 11 wherein the controller is further configured or automatically stop the flow of grain when the nozzle position would cause the flow of grain to be delivered outside the receiving container or to a region having a modeled fill level profile indicating that the region is full.

19. The grain transfer system of claim 11 wherein the operator of the work machine and the operator of the receiving vehicle can coordinate relative movement as a function of the fill level profile display of the first region through the nth region of the receiving container.

20. The grain transfer system of claim 11 wherein the system is configured to allow the operator of the work machine to control movement of the receiving vehicle for adjusting the relative position therebetween.

* * * * *